Figure 1:
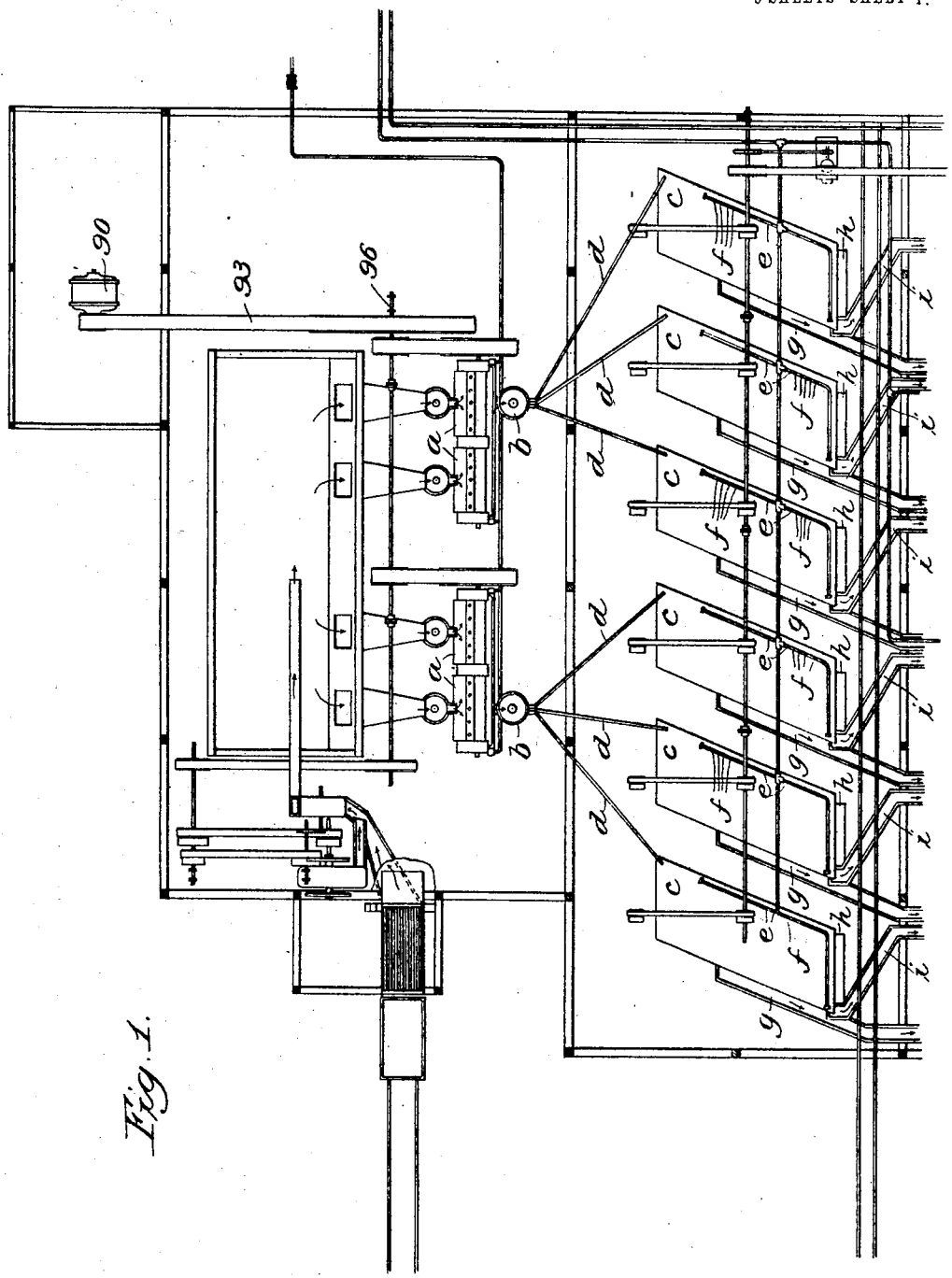

No. 796,754. PATENTED AUG. 8, 1905.
J. R. PARKS.
PROCESS OF TREATING ORES.
APPLICATION FILED AUG. 20, 1903.

9 SHEETS—SHEET 2.

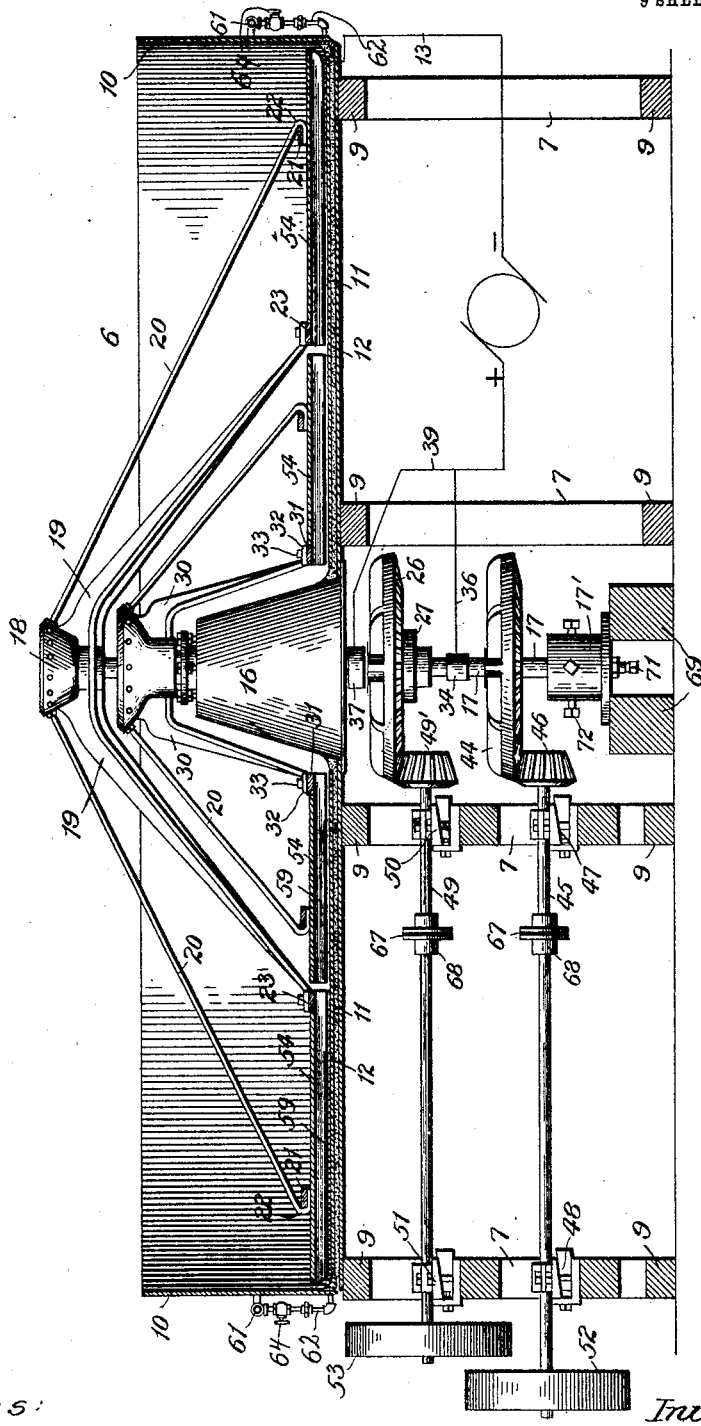

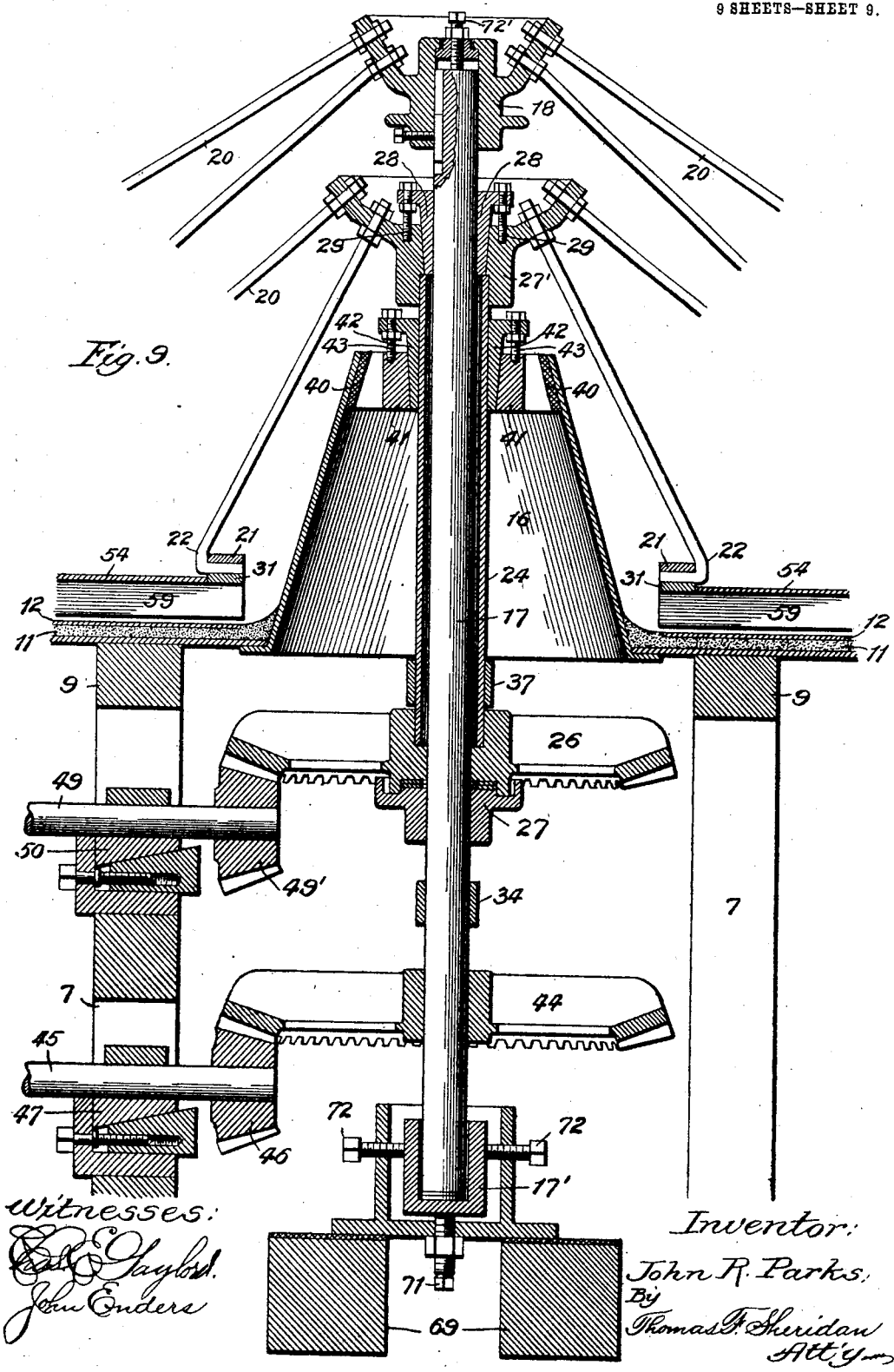

UNITED STATES PATENT OFFICE.

JOHN R. PARKS, OF SPOKANE, WASHINGTON.

PROCESS OF TREATING ORES.

No. 796,754.  Specification of Letters Patent.  Patented Aug. 8, 1905.

Application filed August 20, 1903. Serial No. 170,191.

*To all whom it may concern:*

Be it known that I, JOHN R. PARKS, a citizen of the United States, residing at Spokane, county of Spokane, Washington, have invented certain new and useful Improvements in Processes of Treating Ores, of which the following is a specification.

My invention relates to that class of processes commonly designated as the "electrocyanid" process.

It relates particularly to a process in which the ore is first pulverized, then separated in such a manner that in so far as possible all of the mineral which is susceptible of treatment by means of the cyanid process is included in the slimes and separated from the coarser materials, and particularly from such minerals as are not amenable to treatment by the cyanid process.

The principal object of the invention is to provide a simple, economical, and efficient process for treating ores.

A further object of the invention is to provide a process for treating ores which will enable the minerals which are susceptible of treatment by the cyanid process to be pulverized sufficiently fine to enable them to be readily dissolved in cyanid solution and economically extracted and to be separated from those which are not susceptible of treatment by such process, certain ores requiring extremely fine crushing before they will yield any considerable percentage of their values to any chemical process.

Other and further objects of the invention will appear from an examination of the drawings and the following description and claims.

In this art it is well known that practically all precious metal minerals which are amenable to solution in cyanid of potash must be in so fine a state of division as to be practically microscopic or submicroscopic particles to admit of economical extraction by any cyanid process. Particles of the same minerals which are readily amenable to solution in cyanid when in a very fine state of division are when sufficiently coarse to be easily discernible with the naked eye so slightly attacked as to preclude any successful attempt to economically extract them by means of that chemical alone or by means of any known cyanid process. This objectionable coarseness of the particles is essential to the known methods or processes of cyanid treatment and renders it practically impossible to save a large percentage of the valuable minerals by such known process. One of the principal objects of this invention, therefore, is to enable the valuable particles of metals contained in the most finely-pulverized ore to be intermixed with sufficient liquid containing the desired ingredients to form a slime and then economically extracted by the simultaneous application of air, a current of electricity, and sufficient agitation to maintain the particles of minerals in suspension during such treatment. In the known process the ore is crushed in such a manner as to produce as few slimes as possible, the object being to remove all valuable minerals from the slimes, while in the herein-described process the ore is crushed and treated in such a manner as to collect the greater proportion of the valuable minerals in the slimes for the eletrochemical treatment, separating from the slimes only the clean coarse particles of mineral which are not amenable to economical treatment by cyanid for subsequent recovery of their values by smelting or any other process. By this means all particles of precious-metal-bearing minerals occurring in the ore and which are amenable to the cyanid process are thus prepared and left in the slimes for their most economic extraction by means of the further steps of the process herein described.

Figure 2:
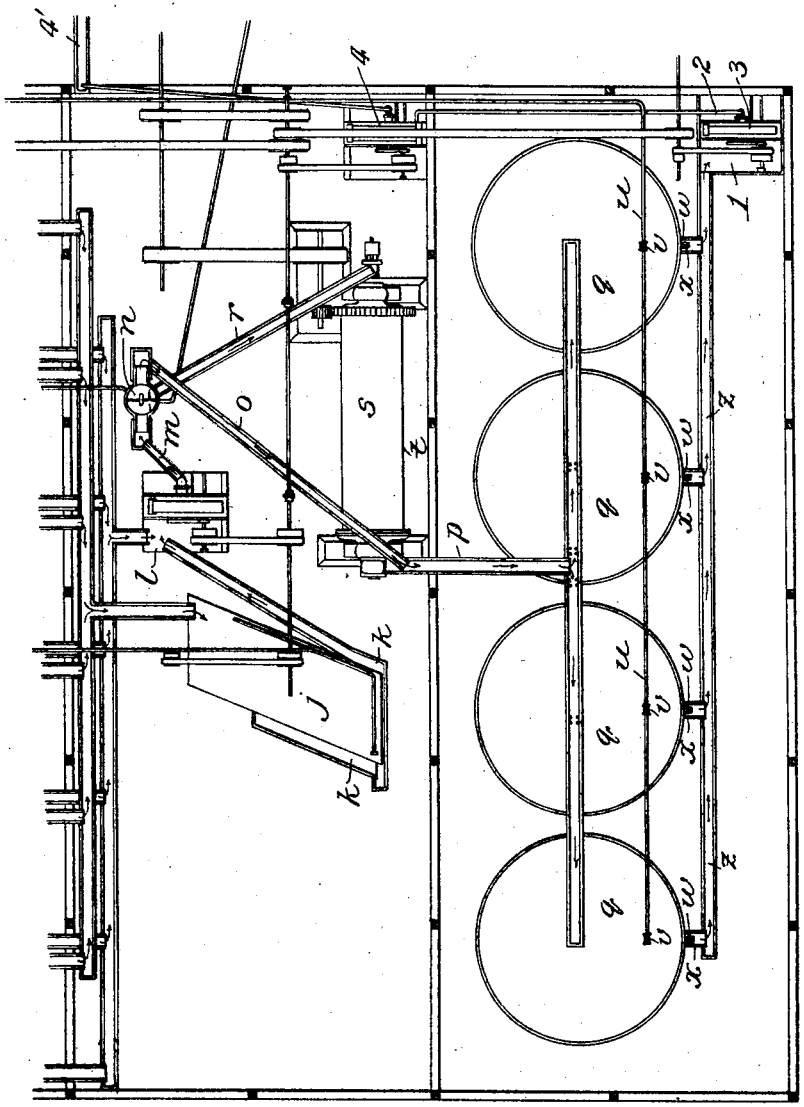
Figure 3:
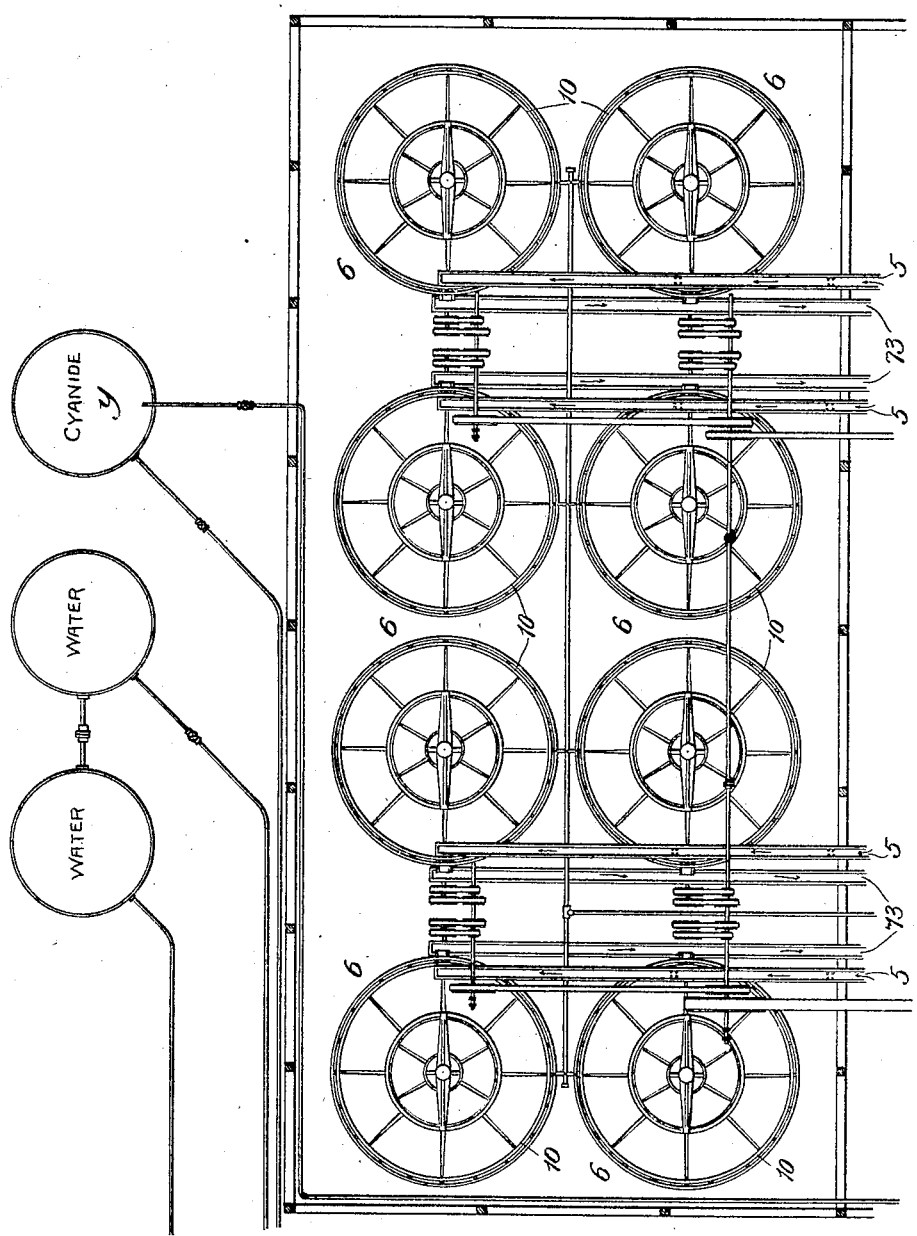
Figure 4:
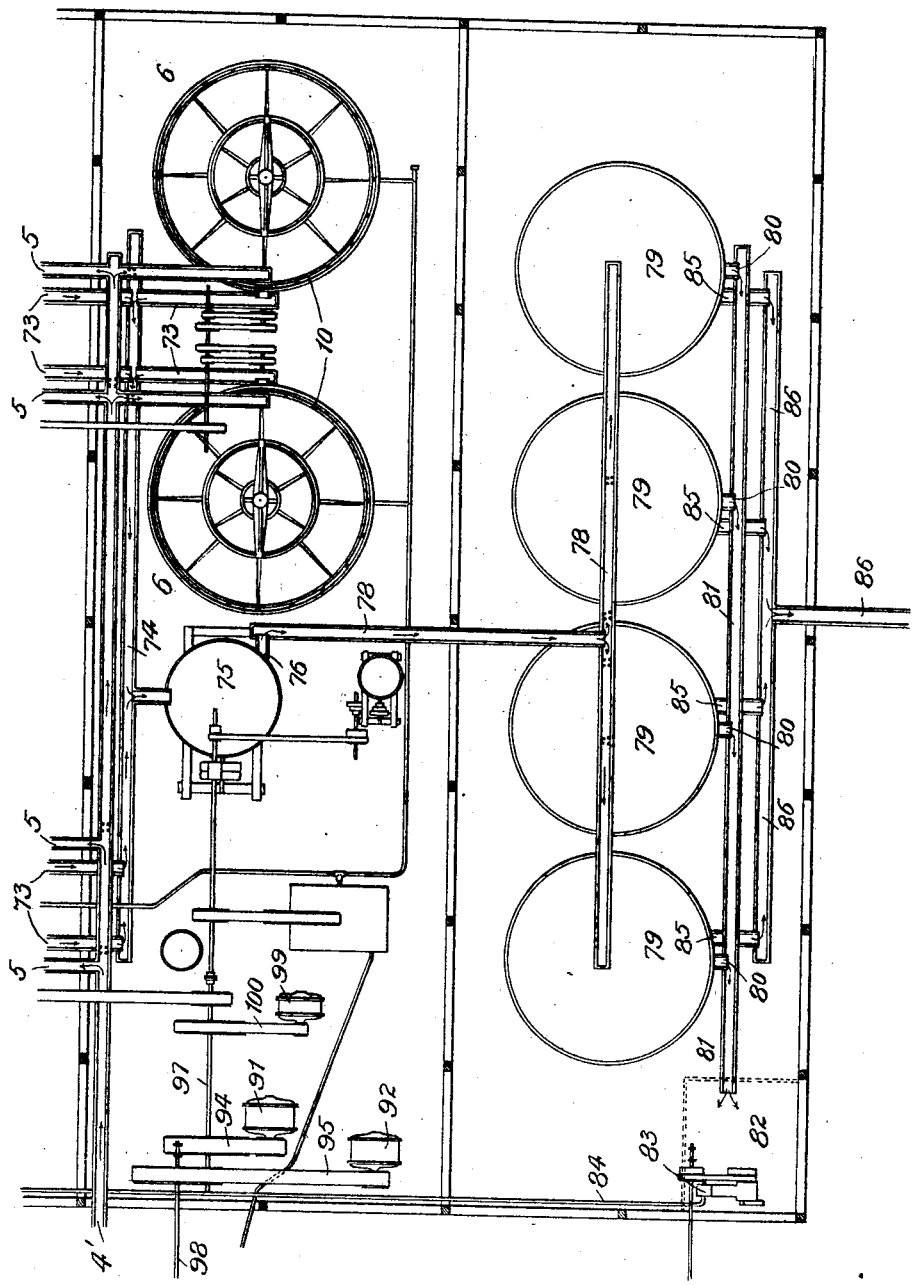
Figure 5:
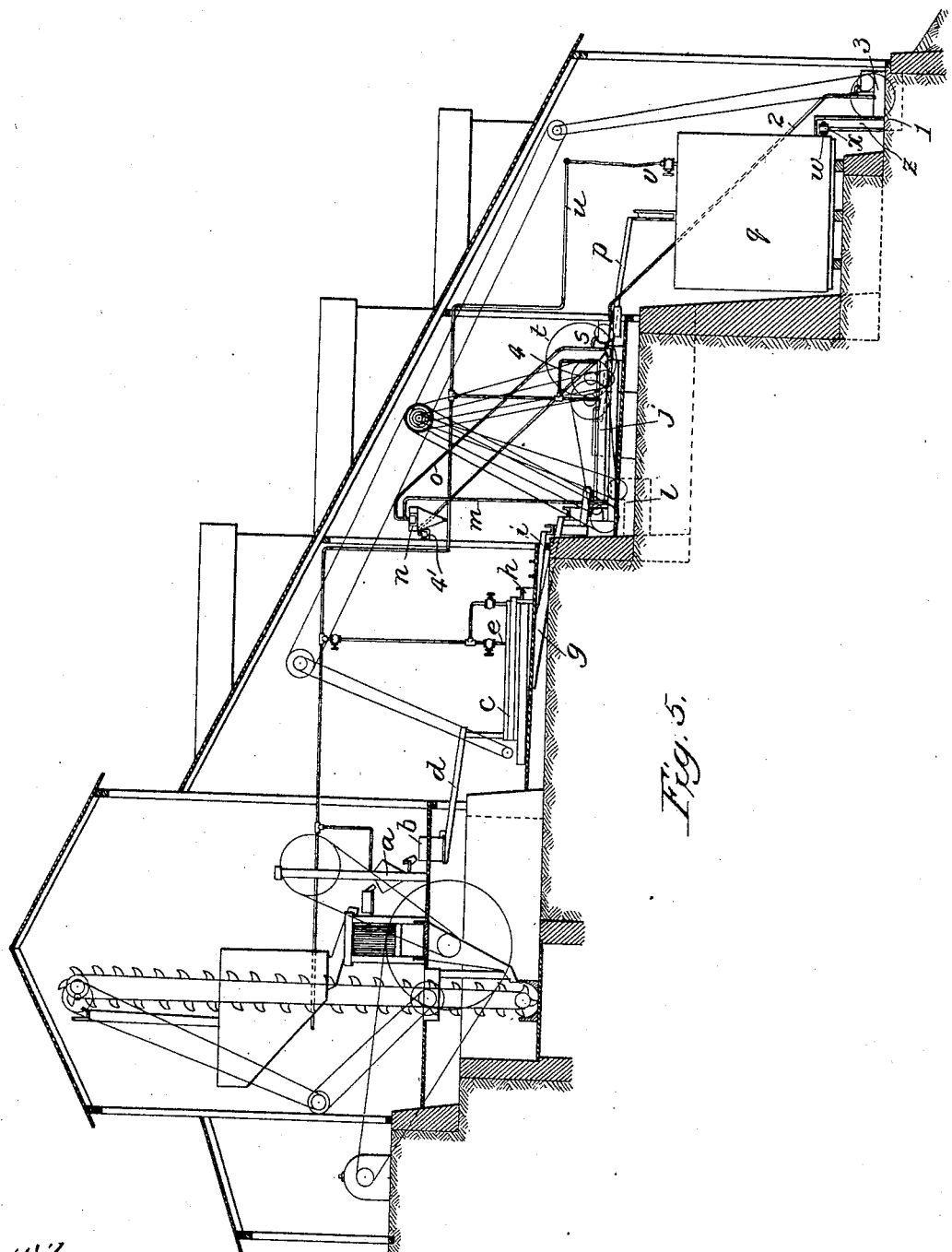
Figure 6:
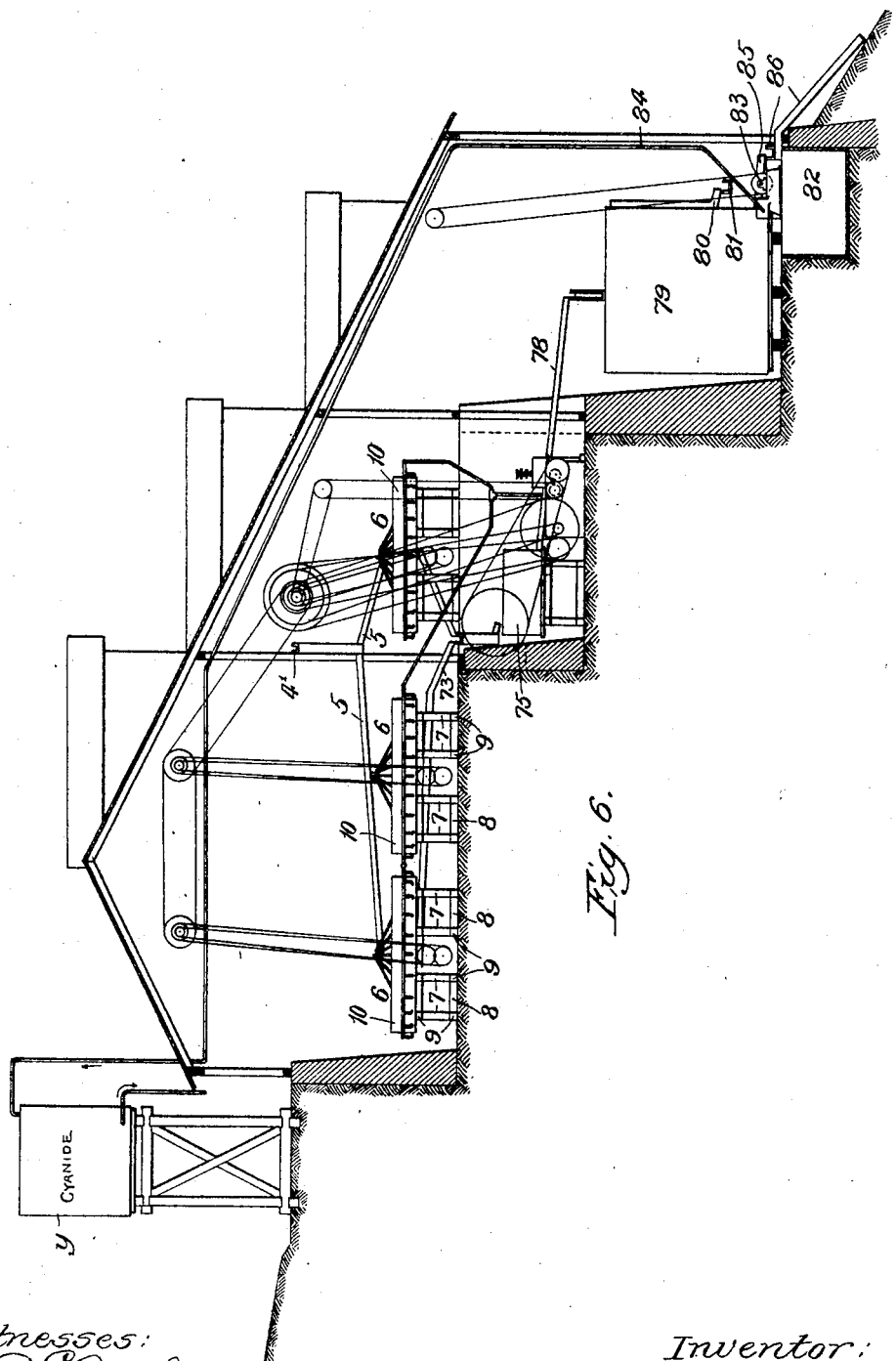
Figure 7:
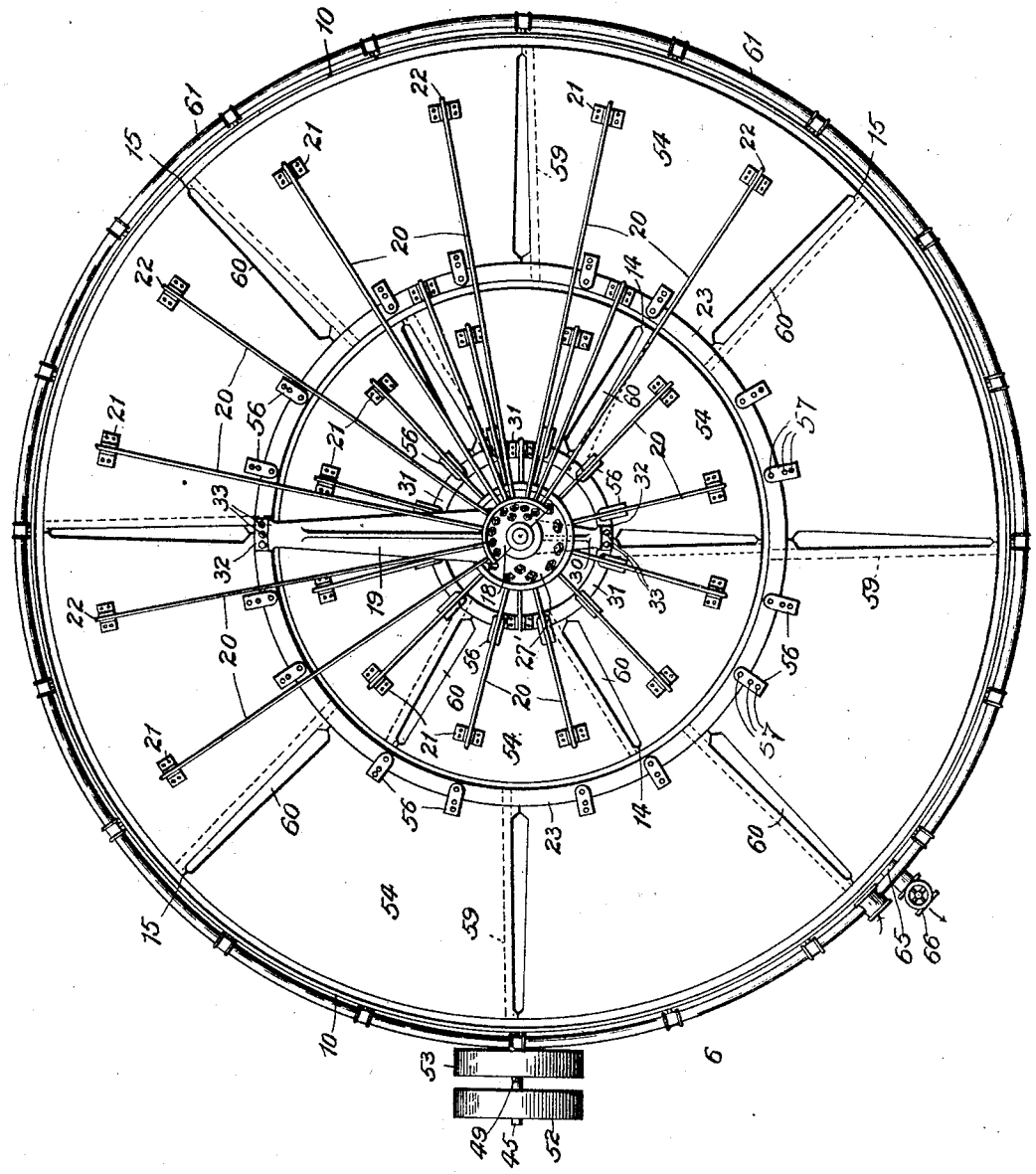

In the accompanying drawings, Figure 1 is a plan view of a stamp-mill for use in connection with my improved process, showing six separating-tables upon which the crushed ore is separated with reference to its susceptibility to cyanid treatment and also the launders leading thereto from the distributer, through which the pulverized ore passes from the stamps. Fig. 2 is a plan view of a separating-table upon which the middlings from the first six tables are again separated to retain the precious metals thereof with the slimes, also showing the classifier for receiving the slimes containing valuable metals from all the tables and in which the finer portions are separated from the coarser, and further showing the tube-mill which crushes the coarser portions of such slime and the settling-tank in which all of the slimes containing precious metals are allowed to settle. This figure also shows the means for conveying the slimes from each to the other of the above elements and tandem pumps with their connections for conveying the pulp to the points for treatment by my improved process, Fig. 3 is a plan view showing the water-tanks, the cyanid-containing tank, six of the mechanisms or pans in which the precious metals are extracted from the mixture, and the launders for conducting the material to and from such mechanisms. Fig. 4 is a plan view showing two additional mechanisms or pans belonging to the same group, but not shown in Fig. 3, and also the amalgam-trap and settling-tanks for clarifying the cyanid solution, together with the means for conveying the materials to and from such elements, a pump with its connections for pumping the clarified cyanid solution back to the settling-tank and dynamo, two motors, and a clean-up upon which the amalgam is finally cleaned. Fig. 5 is a view in elevation of the parts shown in Figs. 1 and 2. Fig. 6 is a view in elevation showing the parts illustrated in Figs. 3 and 4. Fig. 7 is a detailed plan view of one of the mechanisms comprising the shells or pans in which the precious metals are extracted from the ore by my improved process. Fig. 8 is a sectional elevation of the mechanism shown in Fig. 7. Fig. 9 is an enlarged sectional elevation of the central portion of the mechanism shown in Figs. 7 and 8.

In practicing my process I use the following composition: To each ton of ore carrying from sixty to eighty ounces of silver per ton I use from twelve to twenty pounds of cyanid of potash, six to ten pounds of salt, six to eight pounds of lime, one ton of water, and from three hundred to five hundred ounces of quicksilver. In treating five tons of this mixture in the pan twenty jets of compressed air are introduced at a pressure varying from two to four pounds per square inch. A sufficient quantity of direct-current electricity is furnished and passed through the pulp in suspension in the foregoing mixture at about ten volts to amount to from two to five amperes per square foot of the mixture within the electric current measured in gross section therethrough and at right angles to the direction of the current. This current is passed through the mixture simultaneously with the application of the air thereto and simultaneously with the agitation and circulation of the mixture necessary to hold the minerals and pulp in constant suspension in the electric zone or field.

I am aware that cyanid of potassium has been used for the treatment of ores and also that electricity has been employed; but I am not aware that electricity, air, and cyanid of potassium have been applied to the finely-pulverized ore simultaneously and also simultaneously with the agitation of such mixture, so as to keep the particles of mineral in suspension while subjected to the combined action of all three. Further, I am not aware that there have been used simultaneously salt and lime or other electrolyte in contact with quicksilver.

My improved process may be practiced as follows: by first pulverizing the ore and intermixing water therewith to form a slime containing valuable minerals susceptible of cyanid treatment, then separating such slime from the portion of the ore less susceptible to cyanid treatment, then separating the finer from the coarser particles contained in the slime, then repulverizing the coarser particles of the ore thus separated and intermixing them with the finer particles contained in the slime, then allowing the mixture to settle, then removing the necessary amount of water therefrom to form a pulp, then intermixing cyanid of potassium, water, salt, and lime, then intermixing the necessary amount of quicksilver and placing the mixture in contact with metallic elements insulated from each other and each connected to an opposite pole of a source of electric supply, then maintaining the particles of mineral contained in such mixture by agitating it and simultaneously passing air and a current of electricity therethrough, then separating the remaining portions of the pulp from the amalgam, then agitating such portions of the pulp to remove such amalgam as may have accidentally remained therein, then allowing the pulp to settle to clarify the cyanid solution, then removing the clarified cyanid solution from the pulp, and finally collecting the amalgam containing the deposited minerals.

In carrying out my improved process it is necessary first to pulverize the ore to a comparatively fine pulp. In order to accomplish this, I employ an ordinary stamp-mill $a$, such as is shown in Fig. 1, with the copper plates commonly used removed, and in their stead a distributer $b$ for conveying equal parts of the material pulverized to each of a plurality of slime-tables $c$, which may be of the type commonly known as the "Overstrom" table. These tables are mounted vibratably in the ordinary manner, and launders $d$ extend from the distributer to the receiving end of each of them, respectively, so that when the tables are vibrated the material passes diagonally across the surface thereof to the opposite side and end. Water is introduced to the upper surface of such tables by means of a pipe $e$ at the upper edge thereof, such pipe having suitable openings $f$ along the upper side or edge of the tables. As the pulverized ore is deposited upon the upper corner of the table, it therefore passes, as above suggested, with the water necessary to form a slime of the desired consistency toward the lower side and end of the tables, the finer particles being forced by the water which passes from the openings in the pipes toward the lower side of the table, over which they pass in the form of slimes. The coarser particles being less susceptible to movement by the force of the water pass downward to the lower end of the table and are thus separated from the slimes and the middlings, passing over the edge of the table at a point between the slimes and the heavy coarse material.

In order to enable the particles of mineral which are susceptible of economic treatment by means of the cyanid process to be retained in the slimes, it is of course necessary that the ore as it passes through the stamps be pulverized to an unusual degree of fineness. To accomplish this, the screens surrounding the mortars of the stamps are made of the desired fineness of mesh and raised so that the interstices thereof are above the point of contact between the stamp and anvil such a distance that the material will not pass therethrough until the desired fineness is obtained. Being in this condition when it reaches the slime-tables, it will be readily seen that not merely the light and valueless portions of the ore, but also a large percentage of the most valuable minerals in the ore in a minute state of division, pass with the slimes into the launder $g$, which leads to the pump-sump $l$, hereinafter referred to, while the coarser material passes into the boxes $h'$, from which it may be removed and submitted to any desired process. The middlings pass through the launder $i$, Fig. 1, to the middlings-table $j$, Fig. 2, which is also vibratably mounted and separates the middlings deposited thereon with relation to their weight and without regard to the size of the particles. The heavier particles, containing substantially all of the material which is not susceptible to the cyanid process, including nearly all the basic materials, are thus separated from the lighter portions, which contain substantially all of the valuable minerals which have passed to such table from the slime-tables hereinbefore described and which are susceptible to cyanid treatment by this method. The heavier materials are thus deposited in a box at the lower end of the middlings-table, from which they may be removed and treated in any desired manner, while the more valuable minerals which are to be treated by the present process pass in the form of slimes through a launder $k$ to a pump-sump $l$, from whence, together with all of the slimes from the tables $c$, they are pumped through a pipe $m$ into a classifier $n$, which may be of the type commonly known as the "Klein" classifier. This classifier in the ordinary processes known to the art and in the uses to which it is commonly applied separates the minerals with reference to their specific gravities for subsequent mechanical concentration. I, however, employ it for an entirely different purpose and in a different capacity in connection with this process—namely, for separating all the coarse from all the fine material or for "sizing." The fine material or slimes containing valuable minerals pass over the top of the classifier and from thence through a launder $o$, which leads to the distributing-launder $p$, which conveys such material to the settling-tanks $q$. The coarse material, also containing precious-metal values, passes from the lower portion or bottom of the classifier through a launder $r$ to the inlet end of a tube-mill $s$, which may be of the type known as the "Gates" tube-mill, comprising a revolving cylinder $t$, containing either metallic balls or flint boulders (not shown) for the purpose of pulverizing the ore as it passes therethrough, which mills, however, are well known in the art and need no detailed description here. After passing through the tube-mill and having been thus recrushed this portion of the ore is conducted through the launder $p$, where it joins the fine material or slimes from the classifier, together with which it passes in the form of slimes through the distributing-launder, already mentioned, into the settling-tanks $q$, above described. A pipe $u$ is provided having a flexibly-attached branch pipe $v$ for each tank. These branch pipes reach the bottom of the tank adjacent to the opening $w$, which is provided with an exit-valve $x$ of any ordinary and well-known type. By means of this pipe $u$, which is connected with a solution-tank $y$, Fig. 6, at the top of the mill and forms a passage therefrom to such settling-tanks, a suitable cyanid solution is forced by the force of gravity through the pulp which has settled at the bottom of the tank and from which the desired amount of water has been removed. The cyanid solution thus liquefies and forces the moistened pulp through the outlet, then through the launder $z$ to the pump-sump $l$, from whence it is forced upward through a pipe 2, preferably by means of tandem pumps 3 and 4, to the launder $4'$, and thence to distributing-launders 5, (see Figs. 3, 4, and 6,) which lead into the electrocyanid-pans 6, Figs. 3, 4, 6, 7, and 8. When water accumulates in the settling-tanks to an objectionable extent or when it has become clear after the ore has settled, it is removed by a series of plugs in the side of the tank and drained off in any desired manner.

All of the mechanisms comprising the electrocyanid-pans being identical, it is only deemed necessary to illustrate and describe one in order to enable those skilled in the art to construct and use the same and to successfully practice the invention.

In constructing my improved electrocyanid-pans to be used in carrying out my process I provide for each pan or shell employed a suitable framework comprising uprights 7, transverse beams 8, and longitudinal beams 9, upon which is mounted a suitable circular shell or pan 10, forming a chamber. The upright walls and bottom of this shell are made, preferably, of boiler-iron. A layer of asphalt 11 of the desired thickness covers the entire bottom of the shell, forming an insulation between such bottom portion and a copper plate 12, which rests upon the upper surface of the asphalt layer and is connected with the negative pole of a suitable source of electricity by means of an electric wire 13.

In order to provide suitable means for subjecting the ore when in suspension in the desired mixture to the simultaneous action of air, electricity, and the cyanid solution, in which the ore is maintained in suspension by agitating the mixture, and to confine the air, so as to thoroughly agitate the mixture while within the electric zone or electric current and while the solution is being agitated and the particles of mineral sustained in suspension, I provide disk mechanism comprising circular plates or annular segmental wrought-iron disks 14 and 15, which extend substantially from the inner wall 16 to the outer wall 10 of the pan, so as to form a substantially complete cover over the mixture under treatment, coextensive with the copper plate on the bottom of the pan. This disk mechanism is adapted to prevent the air which is forced between it and the copper plate or bottom of the pan from escaping upward and also serves to distribute the electric current uniformly over the entire area included between the iron disks and such copper plate. It also provides a substantially uniform and permanent current of electricity from the wrought-iron disks to the copper plate and through the solution hereinafter described. It will also be seen that the disks and copper plate being insulated and at the desired distance apart form what may be termed the "walls" of a passage, through which the mixture to be treated is passed and subjected to the simultaneous action of the electric current, air forced therethrough, and the chemical action of the cyanid, salt, and lime, as hereinafter set forth.

In order to produce the necessary agitation of the mixture to be treated while it is being subjected to the action of the electric current, it is necessary to mount the segmental disks rotatably. To accomplish this, an upright vertical shaft 17 is provided, having its lower end resting in an adjustable step-box 17′ and its upper end provided with a head 18, upon which are mounted rigid arms 19, which extend to the inner side of the outer disk, and suspending-arms 20, which extend to substantially the outer edge of the outer disk, to which they are connected by means of lugs 21, which extend over the extreme curved end 22 of such rod. The rigid arms are attached to the outer segmental disk by means of a wrought-iron ring 23, to which they are bolted or attached in any desired manner. To support the inner segmental disk rotatably, a quill 24 is mounted so as to encircle the vertical shaft already described, its lower end being provided with a gear-wheel 26, mounted in fixed relation thereto and resting upon a seat 27, attached to the vertical shaft already described and rotatable therewith. The upper end of this quill is provided with a supporting-head 27′, similar to the head which is mounted upon the vertical shaft, which in turn is provided with a bearing-sleeve 28, rotatably engaging the vertical shaft and in fixed relation to the head, to which it is attached by means of a bolt 29. This head is provided with rigid arms 30, which are attached to the inner edge of the inner disk by means of a wrought-iron ring 31, foot 32, and bolts 33 in such manner that the disk is removable without removing the ring when desired, and the ring and disk are removable together, so as to enable the whole to be removed when desired. In order to provide a positive electric current for the segmental disks, a copper ring or collar 34 is mounted upon the vertical shaft in fixed relation thereto, and suitable brushes (not shown) are mounted in sliding engagement with said collar and connected, by means of an electric wire 36, to the positive pole of a direct or straight current dynamo or other suitable source of electric supply. A similar copper ring or collar 37 is mounted at the lower end of the quill in fixed relation thereto and is provided with a brush (not shown) mounted in sliding engagement therewith and attached to a suitable electric wire 39, which is also electrically connected with the positive pole of the dynamo already mentioned. To insulate the shaft and quill, and thereby the segmental disks, from the copper plate or cathode and bottom portion of the tank, as well as the inner and outer walls, a suitable rubber insulator 40 is mounted between the bearing-ring 41, which supports the quill and shaft at the point of connection with the pan. In order to permit the easy rotation of the parts, a bearing-sleeve 42 is interposed between the bearing-ring already described and the quill, so as to provide a sliding engagement therewith, such sleeve being in fixed relation to the bearing-ring 41, to which it is attached by means of a bolt 43. By this arrangement it will be readily seen that the positive current passes from the copper rings 34 and 37, through the vertical shaft and quill, respectively, and from thence through the supporting-arms to the wrought-iron segmental disks, the negative current passing from the copper plate 12, through the wire 13, to the negative pole of the dynamo. To complete the electric circuit, it is only necessary that a suitable electrolyte be added, electrically connecting the upper iron disks with the lower copper plate. This is accomplished in connection with the treatment of the material, as hereinafter more fully described.

It is desirable that the inner and outer disks be rotated at different rates of speed in accordance with the different degrees of fineness of the particles of ore to be maintained in suspension by means of the rotation of such disks and the paddles attached thereto and rotatable therewith and that the speed of movement of such parts be regulated so as to prevent the particles of ore from settling and at the same time prevent such particles as have been deposited upon the amalgamated plate from being removed by abrasion or erosion. In order to accomplish this, the vertical shaft upon which the outer disk is mounted is provided with a gear 44, mounted in fixed relation thereto and operatively connected with a horizontal shaft 45 by means of a bevel-gear 46, such horizontal shaft being mounted adjustably in journal-boxes 47 and 48, and the quill is provided with the bevel-gear 26, already described, operatively connected with the horizontal shaft 49 by means of a bevel-gear 49', such shaft being adjustably mounted in the frame by means of adjustable bearing-boxes 50 and 51, similar to those in which the shaft 45 is mounted. Each of such shafts is provided with a driving-pulley 52 and 53, respectively, adapted to be attached to a suitable source of power by means of a belt in any desired manner.

To provide suitable means for agitating the mixture containing the pulverized ores in suspension to be treated and to provide for the removal and replacing of the disks in order to enable the clean-up to be accomplished at any desired time without necessity for removing the entire disks, such disks are made in segments 54 54, which are separately removable. Each of these segments is provided with a pair of metallic lugs 21 near its outer edge, each adapted to removably engage the end of one of the suspending-rods 20, already described, there being two of such rods for each segment of both the outer and inner disks. Each segment is also provided at its inner edge with a pair of suitable metallic lugs 56, which rest upon the iron ring 23 for the outer disk and iron ring 31 for the inner disk and are held in place by means of pins 57, which engage perforations in such lugs and prevent any horizontal play of the segments. The segments are each provided upon their under surface with a suitable paddle 59, of non-conducting material, preferably wood, of the desired width to leave the necessary space between the bottom of such paddle and the copper plate upon the bottom of the pan. These paddles are attached to the disks by means of insulated bolts. (Not shown.) To permit the pulp, which might otherwise accumulate upon the upper surface of the disks, to pass therethrough into the space between the revolving disk and the bottom of the pan, all the segments are provided with long narrow notches 60 upon the adjacent edges thereof, which together form slots or openings between the segments of the disks—in other words, form suitable openings through the disks when the segments are in place for permitting any material which might otherwise settle and accumulate upon such disks to pass therethrough. These slots are made preferably wider at the inner than at the outer end and are placed upon the following side and closely adjacent to the paddles in order to provide the necessary opening to permit the material which might lodge upon the disk to pass therethrough and at the same time to practically prevent the air from escaping from beneath such disk. It will be readily seen that the downward current of the pulp which passes through the slots closes them to a sufficient extent to prevent the escape of air upward therethrough.

In order to provide suitable means for forcing air through the suspended pulp contained in the space between the revolving disks and the bottom of the pan, a suitable pipe 61 is provided, which entirely encircles the pan and is provided with a plurality of branch pipes 62, having openings at the desired intervals communicating with the inner chamber of the pan between the under surface of the revolving disks and the copper plate on the bottom of the pan. Each of the branch pipes is provided with a suitable valve 64 for controlling the inlet of air therethrough.

To provide suitable means for removing the pulp after treatment, a large outlet-pipe 65 is provided at the bottom of the tank, in which is mounted a suitable valve 66, which may be of any ordinary and well-known type. It is desirable to insulate the driving-shafts, so as to prevent the electricity from leaking by reason of the conductivity of such shafts, and to accomplish this each shaft is provided with a suitable rubber insulator 67, held in place thereon by means of cast-iron shaft-couplings 68.

In order to provide for the adjustment of the rotatable disks with relation to the pan and copper plate, the step-box bearing 17, above referred to, is rigidly mounted upon suitable beams 69, and an adjustable box 17' is mounted therein, resting upon a vertical set-screw 71, horizontal set-screws 72 and 72' being mounted in the rigid step-box and engaging the sides of an adjustable or inner box. The lower end of the vertical shaft resting rotatably in the inner box is thus adapted to be adjusted both vertically and horizontally in any desired direction and to any desired extent.

To provide for the adjustment of the rotatable disks with relation to each other, the head 18, which supports the outer disk, is provided with a vertical set-screw 72, which engages the upper end of the shaft and by means of which the head, and thereby the outer disk, may be raised or lowered, as desired. By means of this arrangement it will be readily understood that the disks are adjustable with relation to each other and to the bottom of the pan and that the horizontal shafts for driving the disks are also adjustable vertically in order to enable the gear-teeth to properly mesh at all times. The object of adjusting the rotatable disks is not merely to prevent the possibility of friction between the parts, but also for the purpose of regulating the quantity of the electric current passing between the anode and cathode surfaces, or, in other words, between the metallic revolving disks and the copper plate on the bottom of the pan, by varying the distance between them when the electrolyte is in use.

In the treatment of the ore in connection with the shells or pans, one of which has just been described and the description of which is sufficient to enable all of such shells or pans to be understood, the pulverized ore is placed in the pans, together with a sufficient quantity of quicksilver to form, with all of the metals dissolved and precipitated in such shells or pans, an amalgam of such consistency that it can be readily scraped from the copper plates on which it is deposited. While in such pans cyanid to the desired strength of solution is added and salt and lime are also introduced to furnish additional electric conductivity to the mixture, so that a proper electric connection between the anode and cathode surfaces, or, in other words, between the revolving wrought-iron disks and the copper plate, is provided. The disks are both revolved at a speed sufficient to prevent the material from settling within their respective zones, or, in other words, sufficient to maintain all particles constantly in suspension in the liquid, the speed at the same time being sufficiently slow to prevent abrasion or erosion of the amalgam from the copper plate. This implies, of course, that the inner disk makes a larger number of rotations in a given time than the outer one; but the speed of movement is substantially the same for both. In other words, the rotation of the disks with the paddles attached to the under surface thereof produces the necessary agitation and circulation of the mixture to maintain the pulverized minerals in suspension constantly, so that the mixture confined between the revolving disks and the copper plate is at all times subjected to the simultaneous action of the air, the electric current, and the cyanid of potassium. A sufficient amount of air under pressure is thus injected into the circulating pulp and solution at the outer edge and bottom of the tank and under the iron disks, and owing to centrifugal force and the differences of specific gravity the air necessarily travels in the general opposite direction to the movement of the pulp in solution and toward the center of the pan. The air thus becomes thoroughly and intimately mixed with the solution to a point of supersaturation, thus affording at all times throughout the solution an excess of oxygen necessary for the chemical solution and combination of the cyanid of potash with the metals to be extracted. The revolving disks being for all practical purposes a cover impervious to the passage of air therethrough, it will readily be seen that the air is confined in the chamber formed between the disks and bottom, or, in other words, retarded from escaping from the mixture, by these revolving covers within the electric current and that such current is coextensive with the area of the copper plate or cathode surface, the revolving disks and copper plates forming what may be termed a "passage" through which the minerals in solution and the liquid electrolyte in which they are suspended pass in a constantly-agitated condition. By means of the rotation of the disks with their paddles, as above described, the mixture confined between the disks and the bottom of the pan has an outward spiral movement through the electric zone or field to the outer rim of the pan, where the centrifugal force causes it to ascend and flow over the outer edge of the iron disks and return in a descending spiral toward the center of such disks, where it again passes downward and into the electric zone, as before. By this means a large amount of the mixture in the pan is constantly subjected to the simultaneous action of the air, cyanid of potassium, the electricity, and the agitation which holds it in suspension between the anode and cathode, or, in other words, between the revolving disks and the copper plate. In fact, the mixture in excess of that which is between the revolving disks and the copper plate is only sufficient to maintain a constant circulation of the mixture between the upper disks and copper plates and within the electric zone. After having been subjected to the treatment above described the pulp contains nothing of value which it is possible to extract by means of the process herein described except the cyanid solution and such amalgam as may accidentally have passed away from the pans with such pulp. The pulp passes from the pans, through the launders 73 and 74, to an amalgam trap or agitator 75, where it is kept in agitation only to a sufficient extent to permit the amalgam which may accidentally be contained therein to settle. It is then passed through an opening 76 near the top of the trap or tank into the launder 77, which conveys it to the distributing-launder 78, from which it empties into one or more settling-tanks 79, which may be of any ordinary and well-known type. After the pulp is settled in these tanks the clear cyanid solution is drained through openings 80 into launders 81 and conducted to the sump-tank 82, from which by means of pump 83 it is forced through pipe 84 and delivered into cyanid-tank $y$ hereinbefore mentioned. This cyanid-of-potash solution having been subjected so long a time to so powerful a current of electricity, all of the base-metal cyanid salts, as well as the precious-metal cyanid salts which were produced through the powerful simultaneous action of the electric current and the chemicals in the presence of the compressed air and while the materials were held in constant suspension subject to the action of such chemicals and electric current, have had through the agency of this powerful electric current all of their metal contents deposited in the amalgam, in conseqence of which the cyanid of potassium has been returned to the pure chemical condition in which it was first introduced into the solution and in perfect condition to use over again for a further charge of pulp. The thick waste pulp in settling-tanks 79 is drawn off at the bottom of said tanks through the opening 85 into the launders 86, by means of which it is conducted out of the mill as a waste product.

To drive the mechanisms above described, driving-motors 90, 91, and 92 are connected by suitable belts 93, 94, and 95, respectively, to the necessary driving-shafts 96, 97, and 98, in turn operatively connected with the operating mechanisms. An electric generator or dynamo 99 is driven by a belt 100 from shaft 97 above mentioned and is connected by wires 13, 36, and 39 already described to the disks 14 and 15 and copper plates 12.

Under the above conditions from silver ores containing from forty to eighty ounces of silver per ton I have extracted and saved seventy-five per cent. of its metallic precious-metal contents and a very small percentage of the base-metal contents in two hours and fifty-four minutes, and in eleven hours and a half I have extracted and saved 91.15 per cent. of such precious-metal values. From refractory gold ores I have extracted and saved ninety-seven and one-half per cent. of the precious-metal contents by the above-described process. The total amount of base metals extracted and precipitated or deposited in the amalgam amounts to about fifty per cent., by weight, of total metallic extraction. This fifty per cent. is made up of one or more of the following metals, copper, lead, and zinc, and is produced in proportion to their occurrence in the ore.

I claim—

1. The process of treating ores, which consists in intermixing pulverized ore, cyanid of potassium, and a fluid electric conductor and simultaneously passing a current of air and a current of electricity through the mixture and retarding the escape of the air from the mixture, substantially as described.

2. The process of treating ores, which consists in intermixing pulverized ore, cyanid of potassium and a suitable liquid and agitating and simultaneously passing a current of air and a current of electricity through the mixture and retarding the escape of air from the mixture, substantially as described.

3. The process of treating ores, which consists in intermixing pulverized ore, cyanid, and a fluid electric conductor, agitating and simultaneously passing a current of air and a current of electricity through the mixture and confining the air in the mixture, substantially as described.

4. The process of treating ores, which consists in intermixing pulverized ore, cyanid, water, salt and lime, agitating the mixture and simultaneously passing a current of air and a current of electricity therethrough and confining the air within the mixture, substantially as described.

5. The process of treating ores, which consists in intermixing pulverized ore, cyanid of potassium, and a liquid electric conductor, placing such mixture between an anode and cathode in contact with quicksilver, agitating the mixture, and simultaneously passing a current of air and a current of electricity through the mixture and confining the air within such mixture, substantially as described.

6. The process of treating ores, which consists in intermixing pulverized ore, cyanid of potassium, a liquid electric conductor into a liquid pulp, placing such mixture in a receptacle containing an amalgamated metallic plate, maintaining such mixture in suspension by agitating it and simultaneously passing a current of air and a current of electricity through the mixture and confining the air within such mixture, substantially as described.

7. The process of treating ores, which consists in intermixing pulverized ore, cyanid of potassium, water and salt into a liquid pulp, placing the same in contact with and between quicksilver and a separate electric conductor, maintaining the mixture in constant suspension by agitating it and simultaneously passing a continuous current of air and a current of electricity through such mixture and retarding the escape of the air, substantially as described.

8. The process of treating ores, which consists in pulverizing ore, then intermixing such pulverized ore with cyanid of potassium, and a liquid electrolyte, placing such mixture in contact with quicksilver, maintaining the pulverized ore in suspension in the mixture by agitating the same, and simultaneously passing a continuous current of air and a current of electricity through the mixture and retarding the escape of the air, substantially as described.

9. The process of treating ores, which consists in intermixing pulverized ore, cyanid of potassium, and an electrolyte, placing such mixture in contact with quicksilver, maintaining the particles of ore in constant suspension by agitating the mixture and simultaneously passing a current of air and a current of electricity therethrough until substantially all of the valuable minerals are removed therefrom and deposited in the form of an amalgam, separating the remaining portion of the mixture from the amalgam, allowing the mixture to settle, and finally drawing off the cyanid solution, substantially as described.

10. The process of treating ore, which consists in intermixing pulverized ore, cyanid of potassium, water and an electrolyte, placing such mixture in a receptacle in contact with and between quicksilver and a separate electric conductor, maintaining the particles of ore in suspension by agitating the mixture and simultaneously passing air and a current of electricity therethrough until substantially all of the valuable minerals are removed therefrom and deposited in the form of an amalgam, removing the remaining portion of the mixture from the receptacle, then separating the amalgam accidentally removed from the receptacle with the mixture, then allowing the mixture to settle and clarify the cyanid solution, and then drawing off the clarified cyanid solution, substantially as described.

11. The process of treating ores, which consists in pulverizing the ore to a fine powder, intermixing water therewith to form a slime containing minerals susceptible of cyanid treatment, allowing such slime to settle and form a pulp, removing the necessary amount of water from such pulp, intermixing cyanid of potassium, water and an electrolyte with the pulp, placing the mixture in a receptacle and in contact with quicksilver, maintaining the minerals contained in the mixture in suspension by agitating such mixture and simultaneously passing air and a current of electricity therethrough until the minerals are precipitated and deposited in the form of an amalgam, and then separating the remaining portions of the pulp from the amalgam, substantially as described.

12. The process of treating ores, which consists in pulverizing the ore to a fine powder, intermixing water therewith to form a slime containing valuable minerals susceptible of cyanid treatment, allowing such slime to settle, removing the necessary amount of water therefrom to form a pulp, intermixing cyanid of potassium, water and an electrolyte with the pulp, placing such mixture in a receptacle containing quicksilver, and maintaining the particles of mineral in suspense by agitating the mixture and simultaneously passing air and a current of electricity therethrough, substantially as described.

13. The process of treating ores, which consists in pulverizing the ore to a fine powder, intermixing water therewith to form a slime containing valuable minerals susceptible of cyanid treatment, allowing such slime to settle, removing the necessary amount of water therefrom to form a pulp, intermixing cyanid of potassium, water and an electrolyte with the pulp, placing such mixture in a receptacle containing quicksilver deposited upon a metallic surface which is connected with a suitable source of electric current, such receptacle also having a metallic element separated therefrom and connected with a suitable source of electric supply forming a cover for preventing air from escaping upward freely from the electrically-discharged mixture, and maintaining the particles of mineral in constant suspension between such electrically-charged elements by agitating the mixture and simultaneously passing air and a current of electricity therethrough, substantially as described.

14. The process of treating ores, which consists in pulverizing the ore, intermixing water therewith to form a slime containing valuable minerals susceptible of cyanid treatment, separating such slime from the portions of the mineral less susceptible of cyanid treatment, allowing such slime to settle, removing the necessary amount of water therefrom to form a pulp, intermixing cyanid of potassium, water and an electrolyte with the pulp, placing such mixture in a receptacle containing quicksilver deposited upon a metallic surface which is connected with a suitable source of electric supply, such receptacle also having a separate metallic element insulated therefrom and connected with a suitable source of electric supply forming a cover for preventing air from escaping upward freely from the electrically-discharged mixture, and maintaining the particles of mineral in constant suspension between such electrically-charged elements by agitating the mixture and simultaneously passing air and a current of electricity therethrough, substantially as described.

15. The process of treating ores, which consists in pulverizing the ore, intermixing water therewith to form a slime containing valuable minerals susceptible of cyanid treatment, separating such slime from the portion of the ore less susceptible to cyanid treatment, then separating the finer from the coarser particles contained in the slime, then repulverizing the coarser particles of the ore thus separated, then allowing the mixture to settle, then removing the necessary amount of water therefrom to form a pulp, then intermixing cyanid of potassium, water and an electrolyte with such pulp, and then suspending the particles of mineral contained in such mixture by agitating it and simultaneously passing air and a current of electricity therethrough, substantially as described.

16. The process of treating ores, which consists in pulverizing the ore, intermixing water therewith to form a slime containing valuable minerals susceptible of cyanid treatment, separating such slime from the portion of the ore less susceptible to cyanid treatment, then separating the finer from the coarser particles contained in the slime, then repulverizing the coarser particles of the ore thus separated, then allowing the mixture to settle, then removing the necessary amount of water therefrom to form a pulp, then intermixing cyanid of potassium, water and an electrolyte with such pulp, then suspending the particles of mineral contained in such mixture by agitating it and simultaneously passing air and a current of electricity therethrough until the minerals are precipitated and deposited in the form of an amalgam, then separating the remaining portions of the pulp from the amalgam, and then separating the cyanid solution from such remaining portions of the pulp, substantially as described.

17. The process of treating ores, which consists in pulverizing the ore, intermixing water therewith to form a slime containing valuable minerals susceptible of cyanid treatment, separating such slime from the portion of the ore less susceptible to cyanid treatment, then separating the finer from the coarser particles contained in the slime, then repulverizing the coarser particles of the ore thus separated and intermixing them with the finer particles contained in the slime, then allowing the mixture to settle, then removing the necessary amount of water therefrom to form a pulp, then intermixing cyanid of potassium, water, salt and lime, then maintaining the particles of mineral contained in such mixture by agitating it and simultaneously passing air and a current of electricty therethrough, then separating the remaining portions of the pulp from the amalgam, then agitating such portions of the pulp to remove such amalgam as may have accidentally remained therein, then allowing the pulp to settle to clarify the cyanid solution, then removing the clarified cyanid solution from the pulp, and finally collecting the amalgam containing the deposited minerals, substantially as described.

JOHN R. PARKS.

Witnesses:
HARRY IRWIN CROMER,
MAUDE DARNELL.